United States Patent [19]

Oda et al.

[11] Patent Number: 5,197,560

[45] Date of Patent: Mar. 30, 1993

[54] SAFETY STOP MECHANISM FOR HOOD OF AUTOMATIVE VEHICLE

[75] Inventors: Yoshio Oda, Kure; Wataru Tsutagawa, Hiroshima, both of Japan

[73] Assignee: Mazda Motor Corporation, Hiroshima, Japan

[21] Appl. No.: 798,726

[22] Filed: Nov. 29, 1991

[30] Foreign Application Priority Data

Nov. 30, 1990 [JP] Japan .............................. 2-130446[U]

[51] Int. Cl.⁵ .................................................. B62D 25/12
[52] U.S. Cl. ............................. 180/69.21; 180/274; 296/76
[58] Field of Search ............... 180/69.2, 69.21, 274; 296/76; 188/377

[56] References Cited

U.S. PATENT DOCUMENTS

| | | | |
|---|---|---|---|
| 3,709,316 | 1/1973 | Glance | 180/69.21 |
| 3,828,885 | 8/1974 | Eissinger et al. | 180/69.2 |
| 4,012,807 | 3/1977 | Kern | 180/69.2 |
| 4,579,185 | 4/1986 | Wakasa | 180/69.21 |
| 4,727,621 | 3/1988 | Emery et al. | 180/69.21 |
| 5,115,878 | 5/1992 | Hayata | 180/69.21 |

FOREIGN PATENT DOCUMENTS

| | | | |
|---|---|---|---|
| 62-255286 | 11/1987 | Japan | 180/69.2 |
| 1-133081 | 9/1989 | Japan | |

*Primary Examiner*—Eric D. Culbreth
*Attorney, Agent, or Firm*—Keck, Mahin & Cate

[57] ABSTRACT

A hood safety stop mechanism for restricting backward movement of a hood, which is bendable convexly upward relative to the car body during a front-end collision of a vehicle, includes an elongated opening formed in either the hood or the car body, and a hook, secured to the other of the hood and car body. The hook is formed so as to be located within the opening without any engagement with an edge of the opening. During a collision, the hook is initially brought into engagement with the edge of the opening when the hood begins to open and after the hood has opened to a predetermined engaging angle. The hook is then disengaged from the opening when the hood begins to bend during further opening of the hood. Finally, the hood is fully bent to a predetermined bend angle.

11 Claims, 4 Drawing Sheets

SAFETY STOP MECHANISM FOR HOOD OF AUTOMATIVE VEHICLE

BACKGROUND OF THE INVENTION

1. Field of the Invention

The present invention relates to an automotive vehicle hood stop mechanism and, more particularly, to a stop mechanism for the hood of an automotive vehicle for controlling backward movement of the hood upon occurrence of a front-end collision.

2. Description of Related Art

An automotive vehicle hood is conventionally provided with a hood stop mechanism, which typically comprises a hook, projecting from one of either a hood or a car body, engaging with an opening or slot, formed in the other of the hood or car body. The hook and opening or slot cooperate to restrict backward movement of the hood toward a front windshield during a collision, such as a front-end collision. An impact force acting on the hood during a collision is directed obliquely upward, at a slight acute angle relative to the hood, so as to open the hood. For this reason, the hook is shaped so as to have an L-shaped end and provide a positive engagement with the hood or the car body when the hood crashes and opens.

In order to allow the hood to be pushed up so as to be opened about a hinge, the hinge must be located behind the hood stop mechanism near the rear end of the hood. In such a hood structure, because impact acting on the hood during a front-end collision is distributed to the hood stop mechanism and the hinge, the hood, if the hinge is broken due to the front-end collision, is prevented from interfering with and shattering the windshield located at the rear end thereof. Such a hood structure is known from, for instance, Japanese Unexamined Utility Model Publication No. 1-133,081, entitled "Safety Click Mechanism For Hood Panel," published Sep. 11, 1989.

To provide additional safety during a front-end collision, it has been proposed to provide a hood with a structure which allows the hood to bend upward to some extent at an approximately intermediate portion thereof while the hood is opened due to the front-end collision. This helps to absorb an impact force acting on the hood. However, although the hood is bendable during opening, it has a hood stop mechanism. The hood, therefore, is limited in upward bending, as well as in backward movement, by the stop mechanism. As a result, the hood may not bend desirably at the intended location and, accordingly, risk that external impact on the hood will be insufficiently absorbed arises.

SUMMARY OF THE INVENTION

It is, therefore, a primary object of the present invention to provide a hood safety stop mechanism for restricting backward movement of a hood of a car body so as to prevent the hood from interfering with or breaking a windshield during a collision of an automotive vehicle.

It is another object of the present invention to provide a hood safety stop mechanism which helps to absorb an impact force acting on a bendable hood during such a collision of the automotive vehicle.

These objects are accomplished by providing a particularly constructed hood safety stop mechanism for restricting backward movement of a hood. The hood is pivoted, at a rear end thereof, by a hinge secured to the car body, and is bendable convexly upward relative to the car body at almost an intermediate portion during a front-end collision of the automotive vehicle. The hood safety stop mechanism includes an opening, defined by an elongated hole formed in either the hood or the car body, and a hook, secured to the other of the hood and car body. The hook is formed so as to be located within the opening without any engagement with the hole, and to be initially brought into engagement with the hole when the hood begins to open due to a front-end collision or when the hood is opened to a predetermined engaging angle of, for instance, approximately 5 degrees. The hook is then disengaged from the hole when the hood begins to bend, during further opening of the hood, to a predetermined disengaging angle of, for instance, approximately 15 degrees. Finally, the hood is fully bent to a predetermined bend angle of, for instance, approximately 37 degrees.

When a front-end collision occurs, an impact force typically acts on the front end of the hood at an obliquely angled upward direction, i.e., at an acute angle with respect to a horizontally lengthwise direction of the vehicle, from the front to the back. The hood is, therefore, opened by the impact force and forced backward. During the opening of the hood, the hood is gradually bent to bring the hook into engagement with an edge of the opening, so as to restrict the backward movement of the hood. Until the hood has opened through the predetermined engage angle, the hook is maintained in engagement with the edge of the opening. In addition, since the impact force acting on the hood is distributed to the hood safety stop mechanism as well as the hinge, the hinge is prevented from being broken during the front-end collision, leading to a positive restriction of backward movement of the hood. Accordingly, interfering with or breaking of the front windshield by the hood is prevented.

Furthermore, if the hood is further bent and opened to the predetermined disengaging angle, the hook is brought out of engagement with the edge of opening. This results in allowing the hood to be bent to the predetermined bend angle so as to absorb the impact force sufficiently during the collision.

BRIEF DESCRIPTION OF THE DRAWINGS

Other objects and features of the present invention will be apparent from the following description, which is directed to a preferred embodiment thereof, when considered in conjunction with the accompanying drawings, in which.

DETAILED DESCRIPTION OF THE PREFERRED EMBODIMENT

Figure 1:
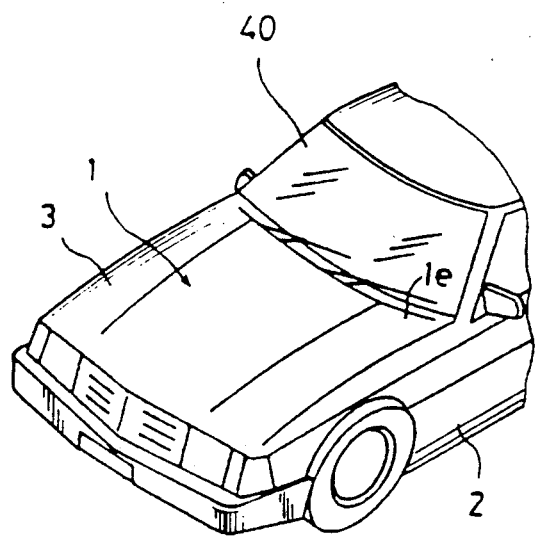
FIG. 1 is a schematic perspective view of a front portion of a car body.
Figure 3:
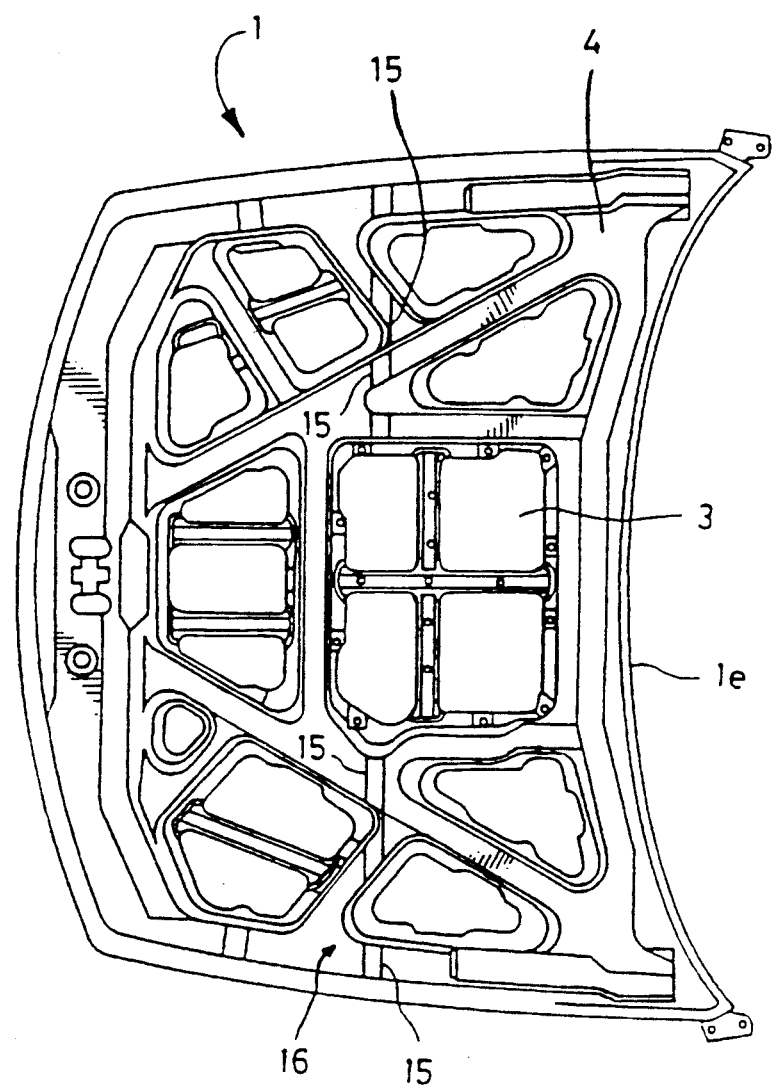
FIG. 3 is a plan view of a hood of the car body as viewed from the inside.

Referring to the drawings in detail and, in particular, to FIGS. 1 and 3, a car body, having a hood 1 with a hood stop mechanism in accordance with a preferred embodiment of the present invention, is shown. The hood 1 hood 1 is supported, at its rear end, for swinging movement by a pair of hinges 11 so as to open and close an engine room 5 defined between front fender panels 2. When closed, the hood 1 is supported, along its lengthwise side edges, by side margins 2a, each of which extends laterally into the engine room 5 from an upper edge of one of the fender plates 2. The hood 1 is provided with a pair of safety stop mechanisms 23, which will be described in detail later, located just before, i.e., longitudinally in front of, the hinges 11.

As shown in detail in FIG. 3, the hood 1 includes an outer hood panel 3 having a curved rear end 1e and an inner panel 4. The curved rear end 1e and the inner panel 4 are connected to each other. The hood 1 is provided with beads 15, forming bending means, formed in the inner panel 4. The beads 15 are convex in cross-section relative to the outer hood panel 3 and discontinuously extend in a straight transverse line with respect to the inner panel 4. The beads 15 form an intermediate bending portion 16 of the hood 1 and allow the hood 1 to bend convexly upward at the bending portion 16.

Figure 2:
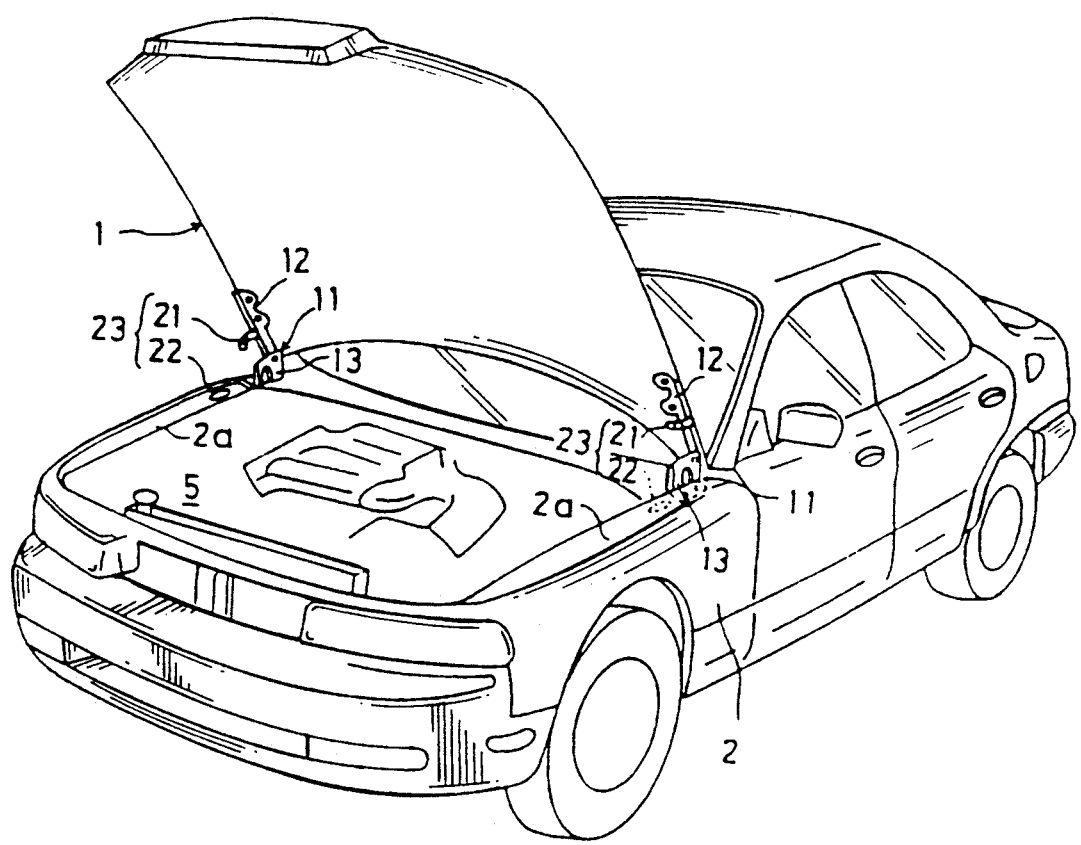
FIG. 2 is a schematic perspective view of a car body equipped with a hood safety stop mechanism in accordance with a preferred embodiment of the present invention.
Figure 4:
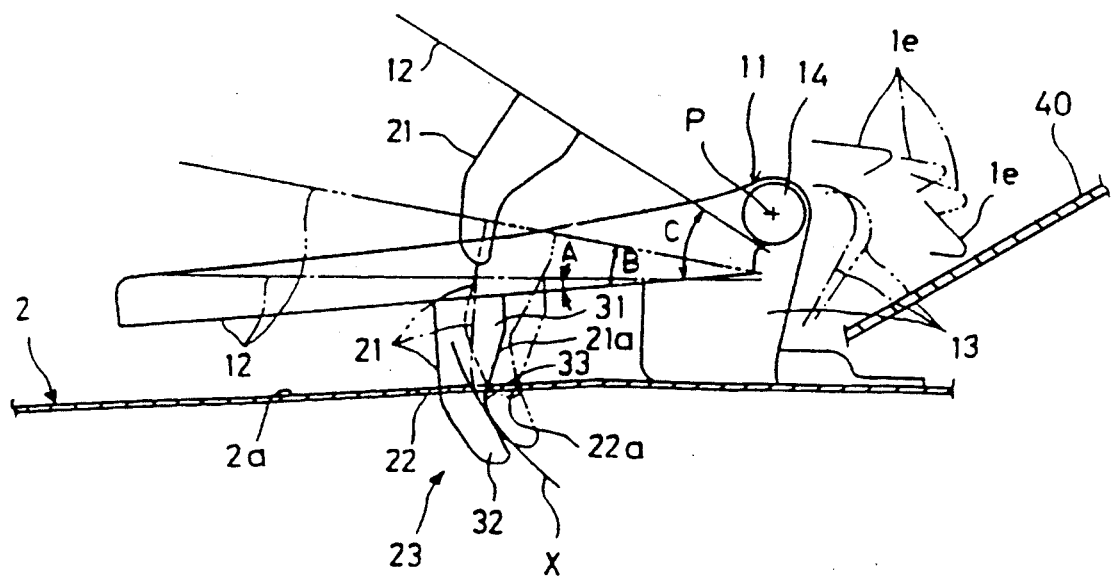
FIG. 4 is a detailed illustration showing operation of a hood safety stop mechanism.

Referring to both FIG. 4 and FIG. 2, each hinge 11 may be seen to include a hinge plate 13, secured to the side margin 2a of the front side fender 2 and extending in a lengthwise direction of the hood 1, and a strap 12, extending in the same lengthwise direction and supporting the hood 1. The hinge plate 13 and strap 12 are connected by a pivot pin 14.

Figure 5:
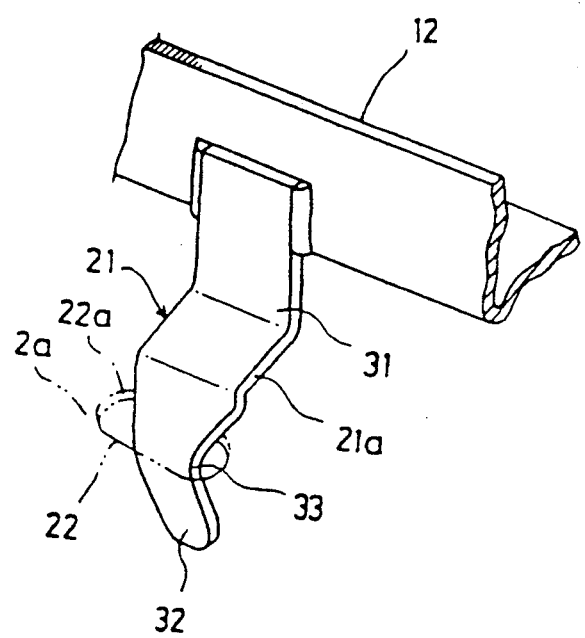
FIG. 5 is a perspective view of a hook of the hood safety stop mechanism.

The safety stop mechanism 23 comprises a hook 21, extending downward from the intermediate portion of the strap 12 of the hinge 11, and an opening 22, defined by an edge 22a, formed in the side margin 2a of each front side fender 2 and elongated in the lengthwise direction. As shown in detail in FIG. 5, the hook 21 has a lower end portion 32 which is stepped so as to extend laterally outside, with respect to the car body, relative to a base end 31 thereof. The hook 21 and the opening 22 are designed and adapted so that the hook 21 exits from and enters into the opening 22, without any interference, as the hood 1 is opened and closed, respectively If the hood 1 is forced backward while being closed, the hook 21 is allowed to move backward until the rear edge 21a abuts the edge 22a of the opening or hole 22. The lower end portion 32 of the hook 21 has a concavely curved rear edge 33.

Referring again to FIG. 4, the lower end portion 32 is designed and adapted so that the lower end of the lower end portion 32 is always outside, as viewed from the rear end of the hood 1, a moving path X of a bottom of the concavely curved rear edge when the strap 12 of the hinge 11 turns about the axis of rotation P of the pivot pin 14. More specifically, the curve of the rear edge 33 of the lower end portion 32 of the hook 21 is designed, in accordance with the principles of the present invention, to be maintained out of engagement with the rear end of the opening 22 while the hood 1 opens through an angle A, which is, for instance, approximately 5 degrees, at the beginning of a front-end collision. The rear edge 33 is then brought into and maintained in engagement with the rear end of the opening 22 when the hood 1 first begins to bend and opens from the angle A to the angle B, which, for instance, is approximately 15 degrees. Finally, the rear edge escapes the rear end of the opening 22 when the hood 1 opens past the angle B. After the hook 21 escapes from the opening 22, the hood 1 is further bent and opened through an angle C, which may for instance, be approximately 37 degrees The operation of the hood safety stop mechanism described above and shown in the drawing figures is best understood by reviewing FIGS. 4 and 6A to 6D, which are schematic illustrations showing movement of the hood 1 during a front-end collision.

Figure 6A:
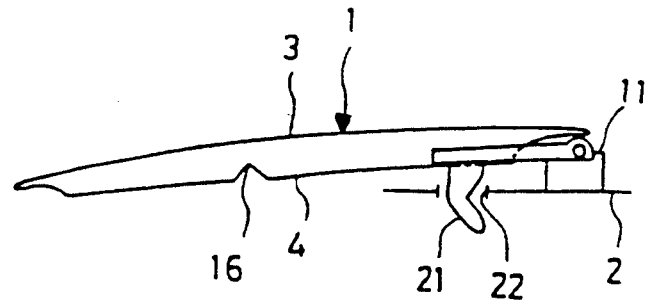
FIGS. 6A–6D are schematic illustrations showing the operation of the hood safety stop mechanism.
Figure 6B:
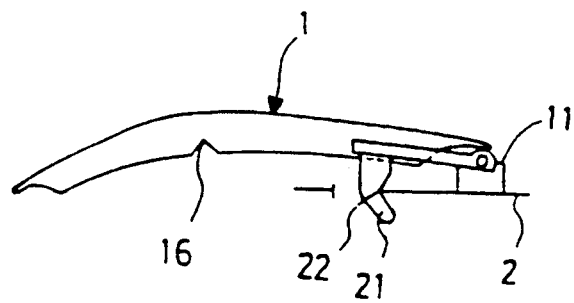

The hood 1, when it is closed, as shown in FIG. 6A, has the hook 21 located in the opening 22 and kept out of engagement with the edge 22a. When a front-end collision arises, an impact force acts on the front end of the hood 1 in an obliquely upward direction and at an acute angle with respect to a horizontally lengthwise direction of the vehicle, from the front to the back. The hood, therefore, opens and is forced backward. During the opening of the hood 1, the hood 1 is gradually bent at the intermediate bending portion 16. Simultaneously, the hook 21 is brought into engagement with the edge 22a of the opening 22 so as to restrict the backward movement of the hood 1, as is shown in FIG. 6B. Until the hood 1 is opened through the angle A (approximately 5 degrees), the hook 21 is maintained in engagement with the edge 22a of the opening 22. In addition, because the impact force acting on the hood 1 is distributed to the hood stop mechanisms 23 as well as the hinges 11, the hinges 11 are prevented from being broken due to the front-end collision Accordingly, the hood 1 is positively restricted from backward movement and does not interfere with or shatter the front windshield 40 (as FIG. 4 makes clear).

Figure 6C:
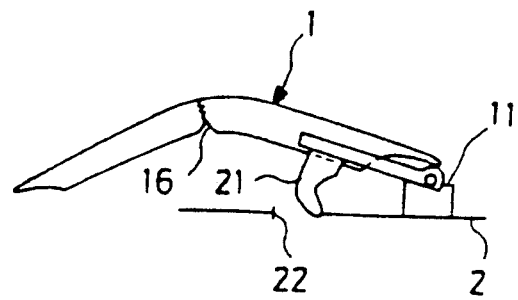
Figure 6D:
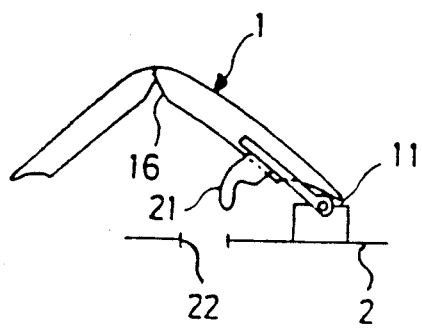

As shown in FIG. 6C, if the hood 1 is further bent and opened to an angle B of approximately 15 degrees, the hook 21 is brought out of engagement with the edge 22a of the opening 22. This results in allowing the hood 1 to be bent to the angle C of approximately 37 degrees, as shown in FIG. 6D, so as to absorb the impact sufficiently. It is apparent that the hook 21, attached to the hood 1, and the opening 22, formed in the front fender panel 2 of the hood safety stop mechanism 23, may be reversed, i.e., the hook may be mounted on the front fender panel, and the opening may be formed in the hood.

It is to be understood that although the present invention has been described in detail with respect to a preferred embodiment thereof, various other embodiments and variants may occur to those skilled in the art. It is intended that any such embodiments and variants which fall within the scope and spirit of the present invention be covered by the following claims.

What is claimed is:

1. A hood safety stop mechanism for restricting backward movement of a hood relative to a car body during a front-end collision of an automotive vehicle, said hood being pivoted at a rear end thereof by a hinge mechanism secured to said car body, said hood safety stop mechanism comprising:

bending means, provided in said hood, for allowing said hood to bend convexly upward at approximately an intermediate portion, said car body including an opening, defined by an elongated hole; and a hook, secured to said hood, formed with a concavely curved rear edge aligned with an edge of said elongated hole, said hook being located within said opening without any engagement between said concavely curved rear edge and said edge of said hole, said hook initially being brought into engagement with said edge of said hole when said hood begins to pen and starts to bend at said bending means due to a front-end collision, then being disengaged from said edge of said hole when said hood is opened to a predetermined disengaging angle, said hook then escaping from said hole as said hood further bends at said bending means during further opening of said hood, said hood finally being fully bent.

2. A hood safety stop mechanism as defined in claim 1, wherein said hook is brought into engagement with said edge of said hole when said hood is opened to a predetermined engaging angle.

3. A hood safety stop mechanism as defined in claim 2, wherein said predetermined engaging angle is approximately 5 degrees.

4. A hood safety stop mechanism as defined in claim 3, wherein said predetermined disengaging angle is approximately 15 degrees.

5. A hood safety stop mechanism as defined in claim 4, wherein said hood is fully bent when it is opened to a predetermined bend angle.

6. A hood safety stop mechanism as defined in claim 5, wherein said predetermined bend angle is approximately 37 degrees.

7. A hood safety stop mechanism as defined in claim 1, wherein said hook comprises a surface, engageable with said edge of said hole, which is curved concavely forward.

8. A hood safety stop mechanism as defined in claim 7, wherein said hook has a lower end portion which is located outside a path through which said surface moves with respect to a pivot of said hinge mechanism as said hood begins to open during said front end collision.

9. A hood safety stop mechanism as defined in claim 8, wherein said surface has a length sufficient to maintain itself in engagement with said edge of said hole until said hood begins to bend at said bending means.

10. A hood safety stop mechanism as defined in claim 1, wherein said bending means allows said hood to be bent convexly upward when said hood is opened to said predetermined disengaging angle.

11. A hood safety stop mechanism as defined in claim 10, wherein said bending means comprises a bead, convex in cross-section, formed in the hood and discontinuously extending in a straight transverse line with respect to the hood for allowing the hood to bend convexly upward therealong.

* * * * *